United States Patent [19]
Matsushita et al.

[11] Patent Number: 5,824,729
[45] Date of Patent: Oct. 20, 1998

[54] SILICONE RUBBER COMPOSITION

[75] Inventors: Takao Matsushita; Osamu Takuman, both of Chiba Prefecture, Japan

[73] Assignee: Dow Corning Toray Silicone Co., LTD., Tokyo, Japan

[21] Appl. No.: 790,782

[22] Filed: Jan. 30, 1997

[30] Foreign Application Priority Data

Jan. 30, 1996 [JP] Japan .................................... 8-037457

[51] Int. Cl.$^6$ ..................................................... C08K 3/10
[52] U.S. Cl. .......................... 524/437; 523/209; 523/212; 524/430; 524/786; 528/24
[58] Field of Search .................... 524/786, 430, 524/437; 523/209, 212

[56] References Cited

U.S. PATENT DOCUMENTS

| | | | |
|---|---|---|---|
| 4,476,155 | 10/1984 | Niemi | 427/58 |
| 5,519,080 | 5/1996 | Matsushita et al. | 524/493 |

FOREIGN PATENT DOCUMENTS

| | | | |
|---|---|---|---|
| 0 316 696 A2 | 5/1989 | European Pat. Off. | C08K 9/06 |
| 0 645 779 A1 | 8/1994 | European Pat. Off. | H01B 3/46 |
| 0 645 779 A1 | 3/1995 | European Pat. Off. | |
| 28 26 221 A1 | 12/1978 | Germany | C09D 3/81 |
| 1 586 997 | 3/1981 | United Kingdom | C08K 3/22 |

OTHER PUBLICATIONS

Elias, H.G., "Makromolekule" 1992, Huthing & Wepf, Hedelberg; DE, vol. 2, pp. 345–350.

*Primary Examiner*—Melvyn I. Marquis
*Attorney, Agent, or Firm*—William F. Boley; Jennifer S. Warren

[57] ABSTRACT

The present invention is silicone rubber compositions the exhibit high mechanical strength and excellent electrical properties such as tracking resistance, arc resistance, and erosion resistance. The improved properties are obtained by incorporation in the compositions aluminum hydroxide powder which has been treated with a treating agent selected from the group consisting of silanes and siloxanes having alkenyl and alkoxy or hydroxy substitution.

18 Claims, No Drawings

SILICONE RUBBER COMPOSITION

BACKGROUND OF INVENTION

This invention relates to silicone rubber compositions. More particularly, this invention relates to a silicone rubber composition that exhibits high mechanical strength and also excellent electrical properties such as tracking resistance, arc resistance, and erosion resistance.

Compositions made by blending aluminum hydroxide powder into silicone rubber compositions are already known. It is also known that silicone rubber moldings with excellent electrical properties can be obtained by the cure of silicone rubber compositions of this type that contain large amounts of the aluminum hydroxide powder (Japanese Patent Application (Kokai) Numbers Hei 5-12605 (12,805/1993) and Hei 7-57574 (57,574/1995)). However, these silicone rubber compositions are not suitable for use in some applications due to their poor mechanical strength values such as tensile strength and tear strength.

Therefore, the object of the present invention is to provide a silicone rubber composition that has excellent electrical properties and, even when lacking reinforcing filler, excellent mechanical strength values.

SUMMARY OF INVENTION

The present invention is silicone rubber compositions that exhibit high mechanical strength and excellent electrical properties such as tracking resistance, arc resistance, and erosion resistance. The improved properties are obtained by incorporation into the compositions aluminum hydroxide powder which has been treated with a treating agent selected from the group consisting of silanes and siloxanes having alkenyl and alkoxy or hydroxy substitution.

DESCRIPTION OF INVENTION

The present invention is a silicone rubber composition comprising:
(A) 100 weight parts organopolysiloxane gum having at least 2 silicon-bonded alkenyl groups in each molecule and the average compositional formula

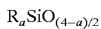
$$R_aSiO_{(4-a)/2}$$

in which R is selected from substituted and unsubstituted monovalent hydrocarbon groups and a has a value from 1.95 to 2.05,
(B) 10 to 300 weight parts aluminum hydroxide powder,
(C) 0.1 to 30 weight parts of a treating agent selected from the group consisting of silanes and siloxane oligomers having alkenyl and alkoxy or hydroxy substitution, and
(D) 0.1 to 10 weight parts organoperoxide.

The present invention also relates to a silicone rubber composition comprising:
(A) 100 weight parts organopolysiloxane gum having at least 2 silicon-bonded alkenyl groups in each molecule and the average compositional formula

$$R_aSiO_{(4-a)/2}$$

in which R is selected from substituted and unsubstituted monovalent hydrocarbon groups and a has a value from 1.95 to 2.05,
(E) 10 to 300 weight parts aluminum hydroxide powder whose surface has been treated with a treating agent selected from the group consisting of silanes and siloxane oligomers having alkenyl and alkoxy or hydroxy substitution, and
(D) 0.1 to 10 weight parts organoperoxide.

To explain the preceding in greater detail, the organopolysiloxane gum (A), which is the base ingredient of the composition according to the present invention, is defined by the average compositional formula $R_aSiO_{(4-a)/2}$ R in this formula is selected from substituted and unsubstituted monovalent hydrocarbon groups and is exemplified by alkyl groups such as methyl, ethyl, and propyl; alkenyl groups such as vinyl, allyl, butenyl, and hexenyl; aryl groups such as phenyl; and 3,3,3-trifluoropropyl, 2-phenylethyl, and 2-cyanoethyl. The subscript a in the formula can have a value from 1.95 to 2.05. Moreover, this component must contain at least 2 silicon-bonded alkenyl groups in each molecule. The alkenyl groups can be bonded in terminal or non-terminal position or at both positions. The molecular structure of this component can be straight chain or partially branched straight chain. This component will have a degree of polymerization generally in the range from 1,000 to 20,000. Moreover, this component may be a homopolymer or copolymer or a mixture of such polymers. The units constituting this component are specifically exemplified by the dimethylsiloxy, methylphenylsiloxy, methylvinylsiloxy, and methyl(3,3,3-trifluoropropyl)siloxy units. The end-blocking groups in this component are exemplified by trimethylsiloxy, dimethylvinylsiloxy, and methylvinylhydroxysiloxy. The instant organopolysiloxane gum is exemplified by dimethylvinylsiloxy-endblocked dimethylsiloxane-methylvinylsiloxane copolymer gums, dimethylvinylsiloxy-endblocked dimethylpolysiloxane gums., silanol-endblocked dimethylsiloxane-methylvinylsiloxane copolymer gums, and methylvinylhydroxysiloxy-endblocked dimethylsiloxane-methylvinylailoxane copolymer gums.

The aluminum hydroxide powder (B) is an essential component that provides the silicone rubber made by cure of the composition according to the present invention with mechanical strength and excellent electrical properties. The aluminum hydroxide exhibits a greater reinforcing activity as its particle size declines, and particle sizes in the range from 0.2 to 50 micrometers can be generally employed while particle sizes in the range from 0.2 to 10 micrometers are preferably used. Component (B) is used at 10 to 300 weight parts and preferably at 30 to 200 weight parts, in each case per 100 weight parts component (A). The effects from this component in terms of electrical insulation and improvement in mechanical strength are inadequate when it is used at less than 30 weight parts. On the other hand, the use of more than 200 weight parts of this component causes the cured product to be brittle.

The treating agent (C), which is the component that characterizes the present invention, is an essential component that functions to improve the mechanical strength of the composition according to the present invention by treating the surface of component (B). Component (C) is exemplified by alkenyltrialkoxysilanes such as vinyltrimethoxysilane, vinyltriacetoxysilane, allyltrimethoxysilane, butenyltrimethoxysilane, hexenyltrimethoxysilane, and N-beta-(N-vinylbenzylaminoethyl)-gamma-aminopropyltrimethoxy-silane; silanol or alkoxy-endblocked straight-chain organosiloxane oligomers that contain 25 weight percent or less alkenyl in pendant position; and oligomeric siloxane resins containing the $RSiO_{1.5}$ unit (T unit, R defined as above) and $SiO_2$ unit (Q unit) and in which all or part of R is alkenyl.

The organoperoxide (D) is a vulcanizing agent that cures the composition according to the present invention at elevated temperature. This component can be the organoperoxides already generally known for use as vulcanizing agents for silicone rubber compositions, for example, benzoyl peroxide, tert-butyl perbenzoate, 2,4-dichlorobenzoyl peroxide, dicumyl peroxide, and 2,5-dimethyl-2,5-di(tert-butylperoxy)hexane.

The composition according to the present invention comprises the above-described components (A) to (D); however, the material afforded by preliminary treatment of the surface of (B) with (C) can be used in place of components (B) and (C).

In other words, the silicone rubber composition can comprise:
(A) 100 weight parts organopolysiloxane gum having at least 2 silicon-bonded alkenyl groups in each molecule and the average compositional formula

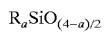

in which R is selected from substituted and unsubstituted monovalent hydrocarbon groups and a has a value from 1.95 to 2.05,
(E) 10 to 300 weight parts aluminum hydroxide powder whose surface has been treated with a treating agent selected from the group consisting of silanes and siloxane oligomers having alkenyl and alkoxy or hydroxy substitution, and
(D) 0.1 to 10 weight parts organoperoxide;
is also encompassed by the present invention.

The components (A) and (D) used in this case are the same as those described above. Component (E) is aluminum hydroxide powder whose surface has been treated with a treating agent as described above. The aluminum hydroxide powder and treating agent used for component (E) are the same, respectively, as the heretofore described components (B) and (C). Component (E) can be prepared simply by adding the treating agent to the aluminum hydroxide powder and mixing these components to homogeneity while heating.

While the composition according to the present invention comprises the above-described components (A) to (D) or (A), (E), and (D), insofar as the object of the present invention is not impaired the composition may also contain those additives heretofore known for use with silicone rubber compositions. Such additives include, for example, reinforcing fillers, non-reinforcing fillers, pigments, heat stabilizers, flame retardants, internal mold-release agents, and plasticizers. The reinforcing fillers are exemplified by fumed silica, precipitated silica, fumed silica that has been treated with organosilane or organosiloxane, and precipitated silica similarly treated. The non-reinforcing fillers are exemplified by diatomaceous earth, quartz powder, mica, calcium carbonate, zinc carbonate, manganese carbonate, aluminum oxide, and titanium oxide. The pigments are exemplified by carbon black and iron oxide red, while the heat stabilizers are exemplified by rare earth oxides, rare earth hydroxides, cerium silanolates, and the cerium salts of fatty acids.

The composition according to the present invention can be prepared simply by mixing the above-described components (A) to (D) or (A), (E), and (D) to homogeneity. The components can be mixed using those mixing means heretofore known for use with silicone rubber compositions, for example, kneader mixers, twin-screw continuous compounding extruders, and two-roll mills.

The composition according to the present invention can be cured by heating to a temperature at or above the decomposition temperature of the organoperoxide (D). The molding method can be selected according to the particular purpose from the heretofore known molding methods, such as compression molding, extrusion molding, and so forth.

The composition according to the present invention as described above has excellent mechanical strength values, such as tensile strength, and tear strength, and can also pass the anti-tracking test specified by International Electrotechnical Commission (IEC) Publication 587, which is more severe than the JIS method. Thus, the instant silicone rubber composition is well suited for use in applications that require such properties and in particular for the fabrication of high-voltage electrical insulation for outdoor use.

Examples. The invention is explained below through working examples, in which "parts" means "weight parts" and the values reported for viscosity were measured at 25° C. The mechanical strength values and electrical properties were measured in the examples using the following methods.

Measurement of mechanical strength values. These were measured using the methods stipulated in JIS K 6301, "Physical Testing Methods for Vulcanized Rubber". Specifically, the heat-curing silicone rubber composition was compression molded by heating for 10 minutes at 150° C. to give a 2 mm-thick silicone rubber sheet. The mechanical strength values of this silicone rubber sheet were measured in accordance with the methods stipulated in JIS K 6301.

Measurement of the electrical properties. An inclined plane anti-tracking test was carried out in accordance with the method stipulated in IEC Publication 587 using a model HAT-520 from Hitachi Kasei Kogyo Kabushiki Kaisha. The test voltage was 3.5 kV. The evaluation A referenced in the tables refers to the time in minutes required until the current flowing in a high-voltage circuit passing through the test specimen exceeded 60 mA. The evaluation B referenced in the tables refers to the time in minutes for tracking to reach a mark placed on the surface of the test specimen at a position 25 mm from the lower electrode.

EXAMPLE 1

Silicone rubber base compounds were prepared by mixing the following to homogeneity in a kneader mixer: 100 parts dimethylvinylsiloxy-endblocked dimethylsiloxane-methylvinylsiloxane copolymer gum containing 99.87 mole % dimethylsiloxy units and 0.13 mole % methylvinylsiloxy units and aluminum hydroxide powder whose surface had been treated with vinyltrimethoxysilane (Higilite H42STV from Showa Denko Kabushiki Kaisha, Japan, average particle size=1 micrometer), wherein the aluminum hydroxide powder was added in the amount reported in Table 1.

0.8 part of a 50 weights silicone oil paste of 2,5-dimethyl-2,5-di(tert-butylperoxy)hexane was mixed to homogeneity on a two-roll mill into 100 parts of each silicone rubber base compound to give the corresponding curable silicone rubber composition. The mechanical strength values and electrical properties of the resulting cured silicone rubber compositions were measured and the obtained results are reported in Table 1.

Comparative Example 1

Silicone rubber compositions were prepared as in Example 1, but in this case using an untreated aluminum hydroxide powder (Higilite H42M from Showa Denko Kabushiki Kaisha, Japan, average particle size=1 micrometer) in place of the vinyltrimethoxysilane-treated aluminum hydroxide powder that was used in Example 1.

The mechanical strength values and electrical properties of these cured silicone rubber compositions were measured as in Example 1 and the obtained results are reported in Table 1. The results reported in Table 1 confirm that the silicone rubbers originating from the compositions according to the present invention had high tensile strengths and high tear strengths and thus had excellent mechanical strengths.

TABLE 1

|  | Example 1 |  | Comparative Example 1 |  |
|---|---|---|---|---|
| Al(OH)$_3$ addition (parts) | 100 | 150 | 100 | 150 |
| durometer (JIS A) | 45 | 65 | 40 | 57 |
| tensile strength (MPa) | 4.2 | 5.1 | 1.8 | 1.7 |
| elongation (%) | 235 | 200 | 350 | 300 |
| tear strength (A) (N/mm) | 7 | 13 | 5 | 8 |
| electrical properties |  |  |  |  |
| evaluation A (min) | — | ≧360 | — | ≧360 |
| evaluation B (min) | — | ≧360 | — | ≧360 |

EXAMPLE 2

A silicone rubber base compound was prepared by mixing the following to homogeneity in a kneader mixer: 100 parts dimethylvinylsiloxy-endblocked dimethylsiloxane-methylvinylsiloxane copolymer gum containing 99.87 mole % dimethylsiloxy units and 0.13 mole % methylvinylsiloxy units, 150 parts untreated aluminum hydroxide powder (Higilite H42M from Showa Denko Kabushiki Kaisha, Japan, average particle size=1 micrometer), and 5 parts silanol-endblocked dimethylsiloxane-methylvinylsiloxane copolymer oligomer with a viscosity of 30 mPa.s and a vinyl content of 10 weight %. Into 100 parts of this silicone rubber base compound was mixed 30 parts dimethyldichlorosilane-treated fumed silica (specific surface area=120 m$^2$/g, Aerosil R972 from Nippon Aerosil Co., Ltd., Japan) to homogeneity to give a silicone rubber base compound.

Into 100 parts of this silicone rubber base compound was mixed 0.8 part of a 50 weighty silicone oil paste of 2,5-dimethyl-2,5-di(tert-butylperoxy)hexane to homogeneity on a two-roll mill to give a curable silicone rubber composition. The mechanical strength values and electrical properties of this cured silicone rubber composition were measured and the obtained results are reported in Table 2.

Comparative Example 2

A silicone rubber base compound was prepared as in Example 2, but in this case without the use of the silanol-terminated dimethylsiloxane-methylvinylsiloxane copolymer oligomer (viscosity=30 mPa.s) that was used in Example 2. A curable silicone rubber composition was then prepared from this silicone rubber base compound according to the procedure described in Example 2.

The mechanical strength values and electrical properties of the cured silicone rubber composition were measured as in Example 2 and the obtained results are also reported in Table 2. The results reported in Table 2 confirm that the cured silicone rubber originating from the composition according to the present invention had a high tensile strength and high tear strength and thus had an excellent mechanical strength.

TABLE 2

|  | Example 2 | Comparative Example 2 |
|---|---|---|
| Al(OH)$_3$ addition (parts) | 150 | 150 |
| treated silica addition (parts) | 30 | 30 |
| durometer (JIS A) | 73 | 74 |
| tensile strength (MPa) | 4.5 | 2.4 |
| elongation (%) | 380 | 400 |
| tear strength (A) (N/mm) | 22 | 15 |
| electrical properties |  |  |
| evaluation A (min) | ≧360 | ≧360 |
| evaluation B (min) | ≧360 | ≧360 |

EXAMPLE 3

3 parts vinyltrimethoxysilane was mixed to homogeneity on a two-roll mill into 100 parts of the silicone rubber base compound whose preparation is described in Comparative Example 1. This mixture was then heated for 24 hours at 100° C. After cooling, 0.4 part 2,5-dimethyl-2,5-di(tert-butylperoxy)hexane was blended in to yield a curable silicone rubber composition. The mechanical strength values and electrical properties of the cured silicone rubber composition were measured as in Example 1 and these results are reported in Table 3.

TABLE 3

|  | Example 3 |
|---|---|
| treatment agent | vinyltrimethoxysilane |
| treatment method | post-treatment |
| durometer (JIS A) | 62 |
| tensile strength (MPa) | 4.8 |
| elongation (%) | 320 |
| tear strength (A) (N/mm) | 15 |
| electrical properties |  |
| evaluation A (min) | ≧360 |
| evaluation B (min) | ≧360 |

I claim:
1. A silicone rubber composition comprising:
    (A) 100 weight parts organopolysiloxane gum having at least 2 silicon-bonded alkenyl groups in each molecule and the average compositional formula

$R_a SiO_{(4-a)/2}$ 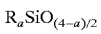

in which R is selected from substituted and unsubstituted monovalent hydrocarbon groups and a has a value from 1.95 to 2.05,
    (B) 10 to 300 weight parts aluminum hydroxide powder,
    (C) 0.1 to 30 weight parts of a treating agent selected from the group consisting of silanes and siloxane oligomers having alkenyl and alkoxy or hydroxy substitution, and
    (D) 0.1 to 10 weight parts organoperoxide.
2. A silicone rubber composition comprising
    (A) 100 weight parts organopolysiloxane gum having at least 2 silicon-bonded alkenyl groups in each molecule and the average compositional formula $R_a SiO_{(4-a)/2}$ 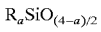

in which R is selected from substituted and unsubstituted monovalent hydrocarbon groups and a has a value from 1.95 to 2.05,
    (E) 10 to 300 weight parts aluminum hydroxide powder whose surface has been treated with a treating agent selected from the group consisting of silanes and siloxane oligomers having alkenyl and alkoxy or hydroxy substitution, and (D) 0.1 to 10 weight parts organoperoxide.

3. A composition according to claim 1, where the organopolysiloxane gum is selected from the group consisting of dimethylvinylsiloxy-endblocked dimethylsiloxane-methylvinylsiloxane copolymer, dimethylvinylsiloxy-endblocked dimethylpolysiloxane, silanol-endblocked dimethylsiloxane-methylvinylsiloxane copolymer, and methylvinylhydroxysiloxy-endblocked dimethylsiloxane-methylvinylsiloxane copolymer.

4. A composition according to claim 1, where the aluminum hydroxide powder has a particle size in the range from 0.2 to 50 micrometers.

5. A composition according to claim 1, where the aluminum hydroxide powder has a particle size in the range from 0.2 to 10 micrometers.

6. A composition according to claim 1 comprising 30 to 200 weight parts of aluminum hydroxide powder per 100 weight parts of the organopolysiloxane gum.

7. A composition according to claim 1, where the treating agent is a silane having alkenyl and alkoxy substitution.

8. A composition according to claim 7, where the treating agent is selected from a group consisting of vinyltrimethoxysilane, vinyltriacetoxysilane, allyltrimethoxysilane, butenyltrimethoxysilane, hexenyltrimethoxysilane, and N-beta-(N-vinylbenzylaminoethyl)-gamma-aminopropyltrimethoxysilane.

9. A composition according to claim 1, where the treating agent is an organosiloxane oligomer having alkenyl and alkoxy or hydroxy substitution and containing 25 weight percent or less pendant alkenyl substitution.

10. A composition according to claim 1, where the treating agent is an oligomeric siloxane resin having alkenyl and alkoxy or hydroxy substitution.

11. A composition according to claim 2, where the organopolysiloxane gum is selected from the group consisting of dimethylvinylsiloxy-endblocked dimethylsiloxane-methylvinylsiloxane copolymer, dimethylvinylsiloxy-endblocked dimethylpolysiloxane, silanol-endblocked dimethylsiloxane-methylvinylsiloxane copolymer, and methylvinylhydroxysiloxy-endblocked dimethylsiloxane-methylvinylsiloxane copolymer.

12. A composition according to claim 2, where the aluminum hydroxide powder has a particle size in the range from 0.2 to 50 micrometers.

13. A composition according to claim 2, where the aluminum hydroxide powder has a particle size in the range from 0.2 to 10 micrometers.

14. A composition according to claim 2 comprising 30 to 200 weight parts of aluminum hydroxide powder per 100 weight parts of the organopolysiloxane gum.

15. A composition according to claim 2, where the treating agent is a silane having alkenyl and alkoxy substitution.

16. A composition according to claim 15, where the treating agent is selected from a group consisting of vinyltrimethoxysilane, vinyltriacetoxysilane, allyltrimethoxysilane, butenyltrimethoxysilane, hexenyltrimethoxysilane, and N-beta-(N-vinylbenzylaminoethyl)-gamma-aminopropyltrimethoxysilane.

17. A composition according to claim 2, where the treating agent is an organosiloxane oligomer having alkenyl and alkoxy or hydroxy substitution and containing 25 weight percent or less pendant alkenyl substitution.

18. A composition according to claim 2, where the treating agent is an oligomeric siloxane resin having alkenyl and alkoxy or hydroxy substitution.

* * * * *

(12) EX PARTE REEXAMINATION CERTIFICATE (9656th)
United States Patent
Matsushita et al.

(10) Number: US 5,824,729 C1
(45) Certificate Issued: *May 16, 2013

(54) SILICONE RUBBER COMPOSITION

(75) Inventors: Takao Matsushita, Chiba Prefecture (JP); Osamu Takuman, Chiba Prefecture (JP)

(73) Assignee: Dow Corning Toray Silicone Company, Ltd., Marunouchi, Chiyoda-Ku, Tokyo (JP)

Reexamination Request:
No. 90/012,259, May 2, 2012

Reexamination Certificate for:
Patent No.: 5,824,729
Issued: Oct. 20, 1998
Appl. No.: 08/790,782
Filed: Jan. 30, 1997

(*) Notice: This patent is subject to a terminal disclaimer.

(30) Foreign Application Priority Data

Jan. 30, 1996 (JP) .................... 08-037457

(51) Int. Cl.
*C08K 13/02* (2006.01)
*C08L 83/04* (2006.01)

(52) U.S. Cl.
USPC ........... 524/437; 523/209; 523/212; 524/430; 524/786; 528/24

(58) Field of Classification Search
None
See application file for complete search history.

(56) References Cited

To view the complete listing of prior art documents cited during the proceeding for Reexamination Control Number 90/012,259, please refer to the USPTO's public Patent Application Information Retrieval (PAIR) system under the Display References tab.

*Primary Examiner* — Timothy J Kugel

(57) ABSTRACT

The present invention is silicone rubber compositions the exhibit high mechanical strength and excellent electrical properties such as tracking resistance, arc resistance, and erosion resistance. The improved properties are obtained by incorporation in the compositions aluminum hydroxide powder which has been treated with a treating agent selected from the group consisting of silanes and siloxanes having alkenyl and alkoxy or hydroxy substitution.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 6, 11 and 14 are determined to be patentable as amended.

Claims 4, 5, 7-10, 12, 13 and 15-18, dependent on an amended claim, are determined to be patentable.

New claims 19-24 are added and determined to be patentable.

1. A silicone rubber composition comprising:
   (A) 100 weight parts organopolysiloxane gum having at least 2 silicon-bonded alkenyl groups in each molecule and the average compositional formula $R_aSiO_{(4-a)/2}$ in which R is selected from substituted and unsubstituted monovalent hydrocarbon groups and a has a value from 1.95 to 2.05,
   (B) 10 to 300 weight parts aluminum hydroxide powder,
   (C) 0.1 to 30 weight parts of a treating agent selected from the group consisting of silanes and siloxane oligomers having alkenyl and alkoxy or hydroxy substitution, and
   (D) 0.1 to 10 weight parts organoperoxide,
   *where at least 2 silicon-bonded alkenyl groups of the organopolysiloxane gum are bonded in terminal positions, or in a terminal position and a non-terminal position.*

2. A silicone rubber composition comprising
   (A) 100 weight parts organopolysiloxane gum having at least 2 silicon-bonded alkenyl groups in each molecule and the average compositional formula $R_aSiO_{(4-a)/2}$ in which R is selected from substituted and unsubstituted monovalent hydrocarbon groups and a has a value from 1.95 to 2.05,
   (E) 10 to 300 weight parts aluminum hydroxide powder whose surface has been treated with a treating agent selected from the group consisting of silanes and siloxane oligomers having alkenyl and alkoxy or hydroxy substitution, and
   (D) 0.1 to 10 weight parts organoperoxide,
   *where at least 2 silicon-bonded alkenyl groups of the organopolysiloxane gum are bonded in terminal positions, or in a terminal position and a non-terminal position.*

3. A composition according to claim 1, where the organopolysiloxane gum is selected from the group consisting of dimethylvinylsiloxy-endblocked dimethylsiloxane-methylvinylsiloxane copolymer, dimethylvinylsiloxy-endblocked dimethylpolysiloxane, [silanol-endblocked dimethylsiloxane-methylvinylsiloxane copolymer,] and methylvinylhydroxysiloxy-endblocked dimethylsiloxane-methylvinylsiloxane copolymer.

6. A composition according to claim 1, comprising 30 to 200 weight parts of *the* aluminum hydroxide powder per 100 weight parts of the organopolysiloxane gum.

11. A composition according to claim 2, where the organopolysiloxane gum is selected from the group consisting of dimethylvinylsiloxy-endblocked dimethylsiloxane-methylvinylsiloxane copolymer, dimethylvinylsiloxy-endblocked dimethylpolysiloxane, [silanol-endblocked dimethylsiloxane-methylvinylsiloxane copolymer,] and methylvinylhydroxysiloxy-endblocked dimethylsiloxane-methylvinylsiloxane copolymer.

14. A composition according to claim 2 comprising 30 to 200 weight parts of *the* aluminum hydroxide powder per 100 weight parts of the organopolysiloxane gum.

*19. A composition according to claim 1, where the organopolysiloxane gum is endblocked with dimethylvinylsiloxy units.*

*20. A composition according to claim 2, where the organopolysiloxane gum is endblocked with dimethylvinylsiloxy units.*

*21. A composition according to claim 1, where the organopolysiloxane gum further comprises at least one silanol group bonded in a terminal position.*

*22. A composition according to claim 2, where the organopolysiloxane gum further comprises at least one silanol group bonded in a terminal position.*

*23. A silicone rubber composition comprising:*
   *(A) 100 weight parts organopolysiloxane gum having at least 2 silicon-bonded alkenyl groups in each molecule and the average compositional formula*

$R_aSiO_{(4-a)/2}$

*in which R is selected from substituted and unsubstituted monovalent hydrocarbon groups and a has a value from 1.95 to 2.05,*
   *(B) 10 to 300 weight parts aluminum hydroxide powder,*
   *(C) 0.1 to 30 weight parts of a treating agent selected from the group consisting of silanes and siloxane oligomers having alkenyl and alkoxy or hydroxy substitution, and*
   *(D) 0.1 to 10 weight parts organoperoxide,*
   *where the organopolysiloxane gum is selected from the group consisting of dimethylvinylsiloxy-endblocked dimethylsiloxane-methylvinylsiloxane copolymer, dimethylvinylsiloxy-endblocked dimethylpolysiloxane, silanol-endblocked dimethylsiloxane-methylvinylsiloxane copolymer, and methylvinylhydroxysiloxy-endblocked dimethylsiloxane-methylvinylsiloxane copolymer.*

*24. A silicone rubber composition comprising:*
   *(A) 100 weight parts organopolysiloxane gum having at least 2 silicon-bonded alkenyl groups in each molecule and the average compositional formula*

$R_aSiO_{(4-a)/2}$

*in which R is selected from substituted and unsubstituted monovalent hydrocarbon groups and a has a value from 1.95 to 2.05,*
   *(E) 10 to 300 weight parts aluminum hydroxide powder whose surface has been treated with a treating agent selected from the group consisting of silanes and siloxane oligomers having alkenyl and alkoxy or hydroxy substitution, and*
   *(D) 0.1 to 10 weight parts organoperoxide,*
   *where the organopolysiloxane gum is selected from the group consisting of dimethylvinylsiloxy-endblocked dimethylsiloxane-methylvinylsiloxane copolymer, dimethylvinylsiloxy-endblocked dimethylpolysiloxane, silanol-endblocked dimethylsiloxane-methylvinylsiloxane copolymer, and methylvinylhydroxysiloxy-endblocked dimethylsiloxane-methylvinylsiloxane copolymer.*

\* \* \* \* \*